US007961737B2

United States Patent
Ge et al.

(10) Patent No.: US 7,961,737 B2
(45) Date of Patent: Jun. 14, 2011

(54) ETHERNET/TMPLS HYBRID NETWORK OPERATION ADMINISTRATION AND MAINTENANCE FRAME CREATION METHOD

(75) Inventors: An Ge, Plano, TX (US); Kamakshi Sridhar, Plano, TX (US); Vincenzo Sestito, Milan (IT); Italo Busi, Cerro Maggiore (IT); Maarten Petrus Joseph Vissers, Huizen (NL); Alberto Bellato, Bernareggio (IT)

(73) Assignee: Alcatel Lucent, Paris (FR)

( * ) Notice: Subject to any disclaimer, the term of this patent is extended or adjusted under 35 U.S.C. 154(b) by 371 days.

(21) Appl. No.: 11/614,339

(22) Filed: Dec. 21, 2006

(65) Prior Publication Data

US 2008/0151907 A1 Jun. 26, 2008

(51) Int. Cl.
*H04L 12/56* (2006.01)
(52) U.S. Cl. ............... 370/395.53; 370/236.2; 370/248; 370/389; 370/395.5; 370/466
(58) Field of Classification Search .................. 370/248, 370/389, 395.5, 466, 236.2, 392
See application file for complete search history.

(56) References Cited

U.S. PATENT DOCUMENTS

| | | | |
|---|---|---|---|
| 2005/0068950 A1* | 3/2005 | Ellis et al. ...................... | 370/389 |
| 2006/0013142 A1* | 1/2006 | Hongal et al. ................ | 370/248 |
| 2008/0101241 A1* | 5/2008 | Mohan et al. ............. | 370/236.2 |
| 2008/0144632 A1* | 6/2008 | Rabie et al. ................ | 370/395.5 |
| 2008/0144657 A1* | 6/2008 | Li ................................ | 370/466 |

OTHER PUBLICATIONS

Vissers, et al.; T-MPLS OAM Frame Format Alternatives; International Telecommunication Union; ITU-T Draft Study Period 2005-2008; Jul. 17, 2006; pp. 5-9; vol. Study Group 13.
Vissers; ETH OAM Frame Format and Scalability of its Processing; International Telecommunication Union; ITU-T Draft Study Period 2005-2008; Aug. 29, 2005; pp. 1-2; vol. Study Group 13.
Ethernet-MPLS Network Internetworking—User Plane Interworking; International Telecommunication Union; Y.1415 (Feb. 2005); ITU-T Standard in Force (I); Feb. 13, 2005; p. 5; Section 7.3.
International Search Report; published Jun. 16, 2008; International Application No. PCT/US2007/084695.

* cited by examiner

*Primary Examiner* — Robert W Wilson
*Assistant Examiner* — Mohamed Kamara
(74) *Attorney, Agent, or Firm* — Garlick Harrison & Markison

(57) ABSTRACT

A method for creating an Operation Administration and Maintenance frame in an Ethernet/Transport Multi-Protocol Label Switch hybrid network. The method includes mapping values in an Ethernet Operation Administration and Maintenance data field in a protocol data unit (PDU) in a first Ethernet Operation Administration and Maintenance frame (Ethernet OAM frame) into a Transport Multi-Protocol Label Switch Operation Administration and Maintenance data field in PDU in a first Transport Multi-Protocol Label Switch Operation Administration and Maintenance frame (TMPLS OAM frame) and mapping values in first control parameter fields in the first Ethernet OAM frame into second control parameter fields in the first TMPLS OAM frame. The PDU in the first TMPLS OAM frame includes added extra fields as necessary, and the second control parameter fields further comprise preselected default information and routing information mapped from values stored in a memory.

18 Claims, 9 Drawing Sheets

US 7,961,737 B2

ETHERNET/TMPLS HYBRID NETWORK OPERATION ADMINISTRATION AND MAINTENANCE FRAME CREATION METHOD

BACKGROUND

Modern communication networks enable the exchange of information between computers and other electronic devices. To enable the efficient and accurate transfer of information, network specific rules, referred to as protocols, are defined which generally specify the characteristics of the communication and of the network itself. Both the transmitting and receiving device, as well as any intermediate devices, have knowledge of and adhere to these rules.

Ethernet is a frame-based computer networking technology often used for local area networks (LANs). However, for performance, historical, and other reasons, networks, such as Multi-Protocol Label Switching (MPLS) networks, IP (Internet Protocol) networks, Asynchronous Transfer Mode (ATM) networks, and others are also found in large numbers. Recently a new type of network technology, referred to as the Transport Multi-Protocol Label Switching (Transport MPLS; TMPLS), is being developed with standards for that network technology currently under consideration. The intent of Transport MPLS is to build on a MPLS network making it carrier grade, i.e., more reliable.

Situations may occur wherein it will be necessary to interconnect Ethernet and Transport MPLS networks together. To effectively maintain such hybrid networks, it will be necessary to convey various information including operation, administration, and maintenance (OAM) information between the dissimilar sub-networks involved.

SUMMARY

In a representative embodiment, a method for creating an Operation Administration and Maintenance frame in an Ethernet/Transport Multi-Protocol Label Switch hybrid network is disclosed. The method comprises mapping values in an Ethernet Operation Administration and Maintenance data field in a protocol data unit (PDU) in a first Ethernet Operation Administration and Maintenance frame (Ethernet OAM frame) into a Transport Multi-Protocol Label Switch Operation Administration and Maintenance data field in PDU in a first Transport Multi-Protocol Label Switch Operation Administration and Maintenance frame (TMPLS OAM frame), and mapping values in first control parameter fields in the first Ethernet OAM frame into second control parameter fields in the first TMPLS OAM frame. The PDU in the first TMPLS OAM frame comprises added extra fields as necessary, and the second control parameter fields further comprise preselected default information and routing information mapped from values stored in a memory.

In another representative embodiment, a data signal embodied in a carrier wave is disclosed. The data signal comprises a Transport Multi-Protocol Label Switch Operation Administration and Maintenance frame (TMPLS OAM frame). A Transport Multi-Protocol Label Switch Operation Administration and Maintenance data field in a protocol data unit (PDU) in the TMPLS OAM frame comprises mapped values from an Ethernet Operation Administration and Maintenance data field in PDU in an Ethernet Operation Administration and Maintenance frame (Ethernet OAM frame); second control parameter fields in the TMPLS OAM frame comprise mapped values from first control parameter fields in the Ethernet OAM frame; the PDU in the TMPLS OAM frame comprises added extra fields as necessary; and the second control parameter fields further comprise preselected default information and routing information mapped from values stored in a memory.

In still another representative embodiment, a data signal embodied in a carrier wave is disclosed. The data signal comprises an Ethernet Operation Administration and Maintenance frame (Ethernet OAM frame). An Ethernet Operation Administration and Maintenance data field in a protocol data unit (PDU) in the Ethernet OAM frame comprises values mapped from a Transport Multi-Protocol Label Switch Operation Administration and Maintenance PDU in a Transport Multi-Protocol Label Switch Operation Administration and Maintenance frame (TMPLS OAM frame); fourth control parameter fields in the Ethernet OAM frame comprise value mapped from third control parameter fields in the TMPLS OAM frame; the PDU in the Ethernet OAM frame comprises added extra fields as necessary; and the fourth control parameter fields further comprise routing information mapped from values stored in a memory.

Other aspects and advantages of the representative embodiments presented herein will become apparent from the following detailed description, taken in conjunction with the accompanying drawings.

BRIEF DESCRIPTION OF THE DRAWINGS

The accompanying drawings provide visual representations which will be used to more fully describe various representative embodiments and can be used by those skilled in the art to better understand the representative embodiments disclosed and their inherent advantages. In these drawings, like reference numerals identify corresponding elements.

DETAILED DESCRIPTION

Figure 1:
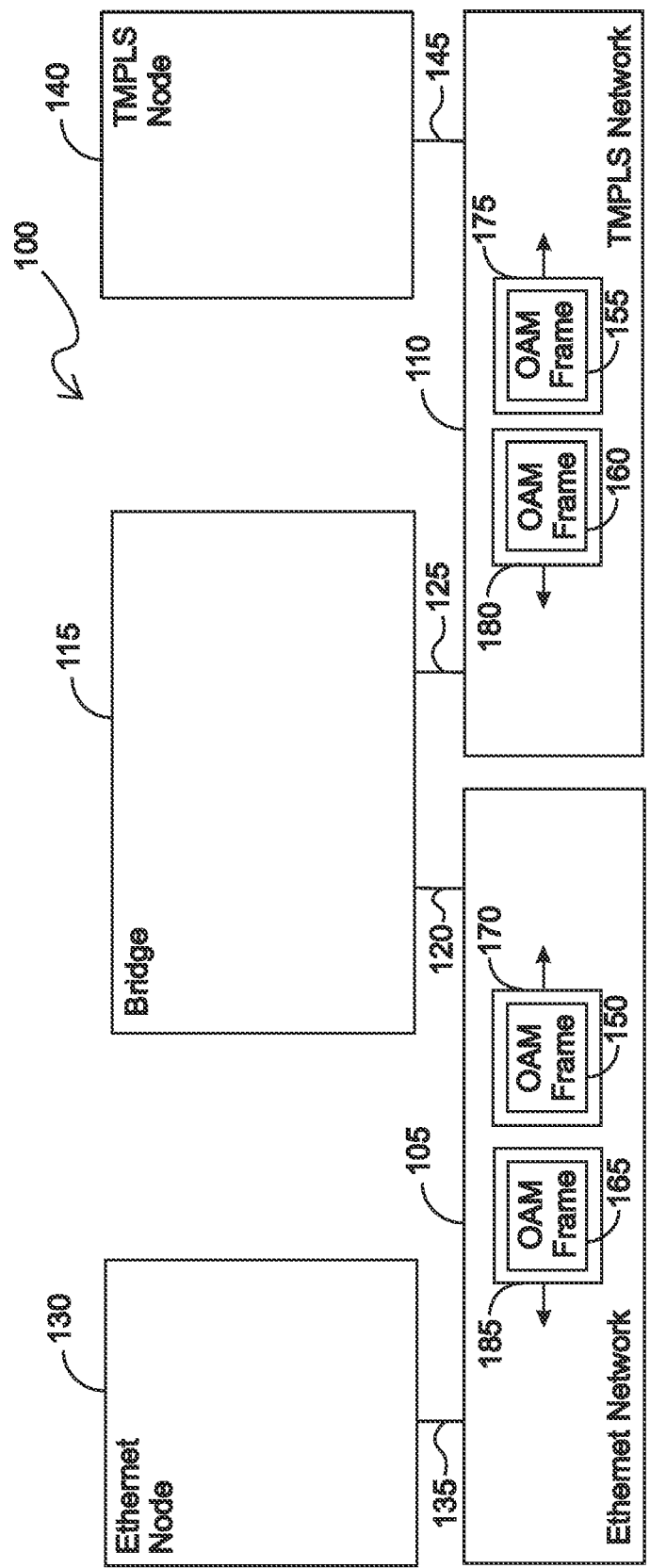
FIG. 1 is a block diagram of an Ethernet/Transport Multi-Protocol Label Switching hybrid network as described in various representative embodiments.

As shown in the drawings for purposes of illustration, novel techniques are disclosed herein for an interworking function module for hybrid Ethernet and Transport Multi-Protocol Label Switching (Transport MPLS; TMPLS) networks.

Situations may occur wherein it will be necessary to interconnect Ethernet and Transport MPLS networks together. To effectively maintain such hybrid networks, it will be necessary to convey various information including operation, administration, and maintenance (OAM) information between the dissimilar sub-networks involved. An existing solution for interworking TMPLS Operation Administration and Maintenance (OAM) protocol data units (PDUs) with Ethernet OAM PDUs do not exist. Other methods of interworking of hybrid networks may require that a state machine be maintained for each OAM frame.

Various kinds of information need to be kept in memory while maintaining a state machine. It may be necessary to keep source and destination addresses for each OAM frame, the time that the OAM frame arrived, the port that the frame arrived on, the sequence number in which the frame arrived, etc. Maintaining a state machine requires a large amount of memory, and the use of such a state machine slows down the transfer of operation, administration, and maintenance information due to the additional time required to access the information in the state machine and to update it upon the reception/transmission of an OAM frame. When state machines are maintained for each OAM frame, a large amount of processing and storage resources are required. As a result, the use of a state machine increases the network cost and lowers its performance.

In contrast, in representative embodiments the interworking function module disclosed herein consumes very little memory and is significantly faster than that of a state machine. Information about a particular OAM frame is not kept in memory. The interworking function module simply keeps a table or other data construct in memory for mapping TMPLS routing labels into VLAN label fields and vice versa. When an OAM frame is received, the interworking function module identifies various parameters in the received frame, appropriately maps those parameters to appropriate parameters in the frame to be transmitted, and then transmits the frame with the mapped parameters. This is a relatively fast process which consumes very little memory. As used herein mapping any given parameter from a source Ethernet OAM frame into a target TMPLS OAM frame or vice versa includes the insertion of the "exact value" from the source parameter, as well as the insertion of an "equivalent value" for the source parameter, into the target parameter.

In the following detailed description and in the several figures of the drawings, like elements are identified with like reference numerals.

FIG. 1 is a block diagram of an Ethernet/Transport Multi-Protocol Label Switching hybrid network 100 as described in various representative embodiments. The Ethernet/Transport Multi-Protocol Label Switching hybrid network 100 may also be referred to herein as the Ethernet/TMPLS hybrid network 100, and as the hybrid network 100. In the representative embodiment of FIG. 1, the Ethernet/TMPLS hybrid network 100 comprises an Ethernet network 105, a Transport Multi-Protocol Label Switching network 110, and a bridge 115. The Transport Multi-Protocol Label Switching network 110 may also be referred to herein as the TMPLS network 110. The bridge 115 communicates with the Ethernet network 105 via a first communication medium 120 and with the TMPLS network 110 via a second communication medium 125. The Ethernet network 105 also communicates with an Ethernet node 130 via a third communication medium 135, and the TMPLS network 110 also communicates with a Transport Multi-Protocol Label Switching node 140 via a fourth communication medium 145. The Transport Multi-Protocol Label Switching node 140 may also be referred to herein as the TMPLS node 140.

As needed for operation and maintenance of the hybrid network 100, the Ethernet node 130 transmits a first Ethernet Operation Administration and Maintenance frame 150 which, after transport through the Ethernet network 105, is received by the bridge 115. For transport through the Ethernet network 105, the Ethernet Operation Administration and Maintenance frame 150 is embodied in a first carrier wave 170. As will be further disclosed in the discussion of FIG. 3 and subsequent figures, the first Ethernet Operation Administration and Maintenance frame 150 is mapped into a first Transport Multi-Protocol Label Switch Operation Administration and Maintenance frame 155 within the bridge 115. The first Transport Multi-Protocol Label Switch Operation Administration and Maintenance frame 155 is subsequently received by the TMPLS node 140 after transport through the TMPLS network 110. For transport through the TMPLS network 110, the first transport Multi-Protocol Label Switch Operation Administration and Maintenance frame 155 is embodied in a second carrier wave 175.

The first Ethernet Operation Administration and Maintenance frame 150 may also be referred to herein as the first Ethernet OAM frame 150. The first Transport Multi-Protocol Label Switch Operation Administration and Maintenance frame 155 may also be referred to herein, as the first TMPLS OAM frame 155.

Also as needed for operation and maintenance of the hybrid network 100, the TMPLS node 140 transmits a second Transport Multi-Protocol Label Switch Operation Administration and Maintenance frame 160 which, after transport through the TMPLS network 110, is received by the bridge 115. For transport through the TMPLS network 110, the second transport Multi-Protocol Label Switch Operation Administration and Maintenance frame 160 is embodied in a third carrier wave 180. As will be further disclosed in the discussion of FIG. 3 and subsequent figures, the second Transport Multi-Protocol Label Switch Operation Administration and Maintenance frame 160 is mapped into a second Ethernet Operation Administration and Maintenance frame 165 within the bridge 115. The second Ethernet Operation Administration and Maintenance frame 165 is subsequently received by the Ethernet node 130 after transport through the Ethernet network 105. For transport through the Ethernet network 105, the Ethernet Operation Administration and Maintenance frame 150 is embodied in a fourth carrier wave 185.

The second Transport Multi-Protocol Label Switch Operation Administration and Maintenance frame 160 may also be referred to herein as the second TMPLS OAM frame 160. The second Ethernet Operation Administration and Maintenance frame 165 may also be referred to herein as the second Ethernet OAM frame 165.

As just discussed, FIG. 1 illustrates two conditions. The first of these conditions occurs when the Ethernet node 130 located on the Ethernet network 105 transmits a message, which, for example, could be a continuity check or loopback message, to the target TMPLS node 140 located in the TMPLS network 110. However, the message from the Ethernet node 130 could also be intended for another maintenance association end point (MEP) on the TMPLS network 110 other than that shown in FIG. 1 or for a maintenance association intermediate point (MIP) such as another bridge on the TMPLS network 110. The second condition occurs when the TMPLS node 140 located in the TMPLS network 110 sends a message, which, for example, could be a continuity check or loopback message, to the target Ethernet node 130 located on the Ethernet network 105. However, the message from the TMPLS node 140 could also be intended for another maintenance association end point (MEP) on the Ethernet network 105 other than that shown in FIG. 1 or for a maintenance association intermediate point (MIP) such as another bridge on the Ethernet network 105.

Figure 2:
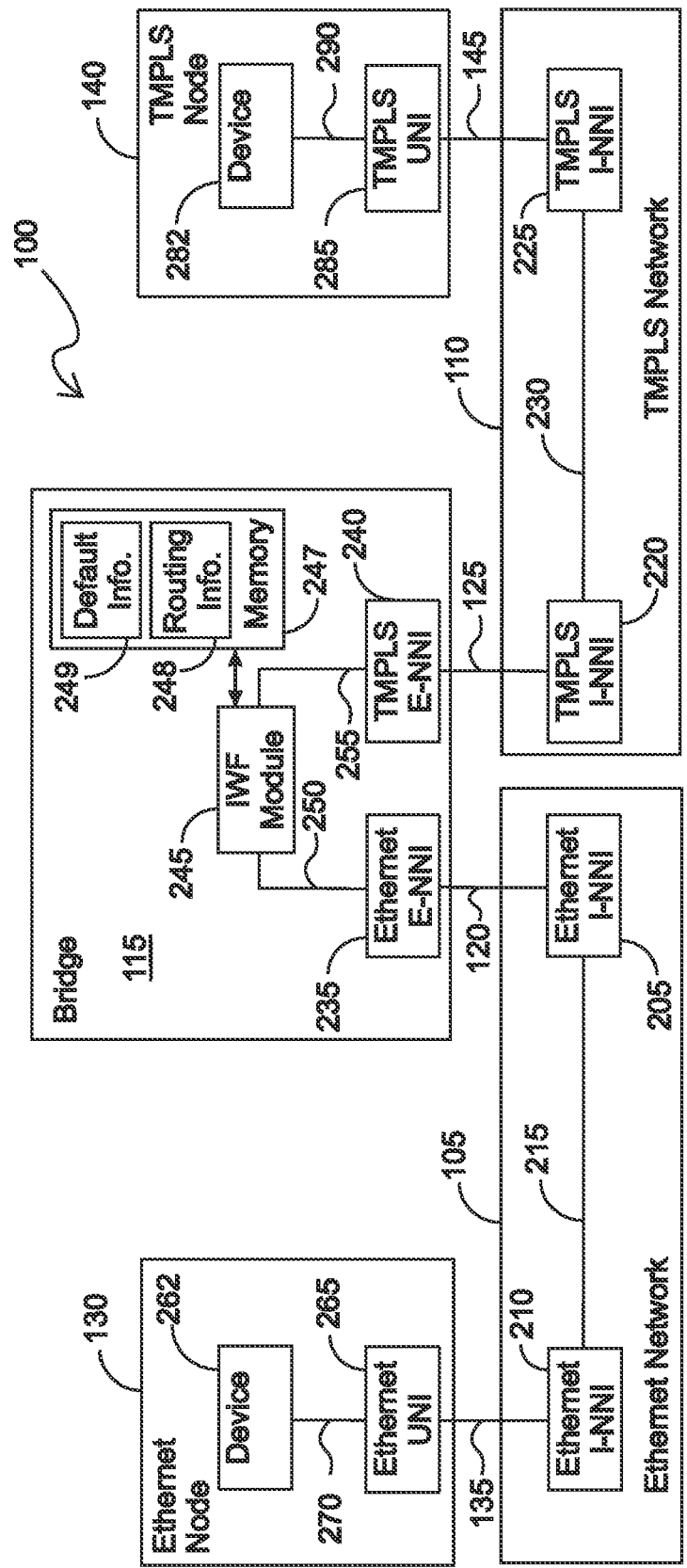
FIG. 2 is a more detailed block diagram of the Ethernet/Transport Multi-Protocol Label Switching hybrid network of FIG. 1.

FIG. 2 is a more detailed block diagram of the Ethernet/Transport Multi-Protocol Label Switching hybrid network 100 of FIG. 1. In the representative embodiment of FIG. 2, the Ethernet network 105 comprises a first Ethernet internal network-to-network interface 205, a second Ethernet internal network-to-network interface 210, and an Ethernet signal transmission medium 215. The first Ethernet internal network-to-network interface 205 may also be referred to herein as the first Ethernet I-NNI 205, and the second Ethernet internal network-to-network interface 210 may also be referred to herein as the second Ethernet I-NNI 210.

Also, the TMPLS network 110 comprises a first Transport Multi-Protocol Label Switching internal network-to-network interface 220, a second Transport Multi-Protocol Label Switching internal network-to-network interface 225, and a Transport Multi-Protocol Label Switching signal transmission medium 230. The first Transport Multi-Protocol Label Switching internal network-to-network interface 220 may also be referred to herein as the first TMPLS I-NNI 220. The second Transport Multi-Protocol Label Switching internal network-to-network interface 225 may also be referred to herein as the second TMPLS I-NNI 225. The Transport Multi-Protocol Label Switching signal transmission medium 230 may also be referred to herein as the TMPLS signal transmission medium 230.

Further, the bridge 115 comprises an Ethernet external network-to-network interface 235, a Transport Multi-Protocol Label Switching external network-to-network interface 240, an interworking function module 245, and a memory 247. The memory 247 comprises routing information 248 which could be maintained in a table, a database, or other data construct and default information 249 which also could be maintained in any of various data constructs. The Ethernet external network-to-network interface 235 may also be referred to herein as the Ethernet E-NNI 235. The Transport Multi-Protocol Label Switching external network-to-network interface 240 may also be referred to herein as the TMPLS E-NNI 240. The interworking function module 245 may also be referred to herein as the IWF module 245.

The interworking function module 245 communicates with the Ethernet E-NNI 235 via fifth communication medium 250 and with the TMPLS E-NNI 240 via sixth communication medium 255. Communication between the bridge 115 and the Ethernet network 105 via the first communication medium 120 referred to in the discussion of FIG. 1 occurs between the Ethernet E-NNI 235 in the bridge 115 and the first Ethernet I-NNI 205 in the Ethernet network 105 via the first communication medium 120. Communication between the bridge 115 and the TMPLS network 110 via the second communication medium 125 referred to in the discussion of FIG. 1 occurs between the TMPLS E-NNI 240 in the bridge 115 and the first TMPLS I-NNI 220 in the TMPLS network 110 via the second communication medium 125.

The Ethernet node 130 comprises a first device 262 and an Ethernet user-to-network interface 265. The Ethernet user-to-network interface 265 may also be referred to herein as the Ethernet UNI 265. Communication between the Ethernet node 130 and the Ethernet network 105 via the third communication medium 135 referred to in the discussion of FIG. 1 occurs between the Ethernet UNI 265 in the Ethernet node 130 and the second Ethernet I-NNI 210 in the Ethernet network 105 via the third communication medium 135. The first device 262 communicates with the Ethernet UNI 265 via a seventh communication medium 270.

The TMPLS node 140 comprises a second device 282 and a Transport Multi-Protocol Label Switching user-to-network interface 285. The Transport Multi-Protocol Label Switching user-to-network interface 285 may also be referred to herein as the TMPLS UNI 285. Communication between the TMPLS node 140 and the TMPLS network 110 via the fourth communication medium 145 referred to in the discussion of FIG. 1 occurs between the TMPLS UNI 285 in the TMPLS node 140 and the second TMPLS I-NNI 225 in the TMPLS network 110 via the third communication medium 135. The second device 282 communicates with the TMPLS UNI 285 via an eight communication medium 290.

In the representative embodiment of FIG. 2, the interworking function module 245 extends the Operation Administration and Maintenance (OAM) functionality from one network technology to another without the need to keep state information or state machines for each OAM frame transmitted. The interworking function module 245 enables end-to-end OAM functionality for a provider that services both Ethernet and TMPLS networks 105,110. While the techniques disclosed herein discuss only Ethernet and TMPLS OAM frames associated with one maintenance association level only, i.e., the Ethernet and TMPLS OAM messages are on the same level, these techniques are not limited to situations involving only the same level. The interworking function module 245 converts TMPLS OAM frames into Ethernet OAM frames and vice versa.

Interworking conversion is not required for data and customer OAM frames since they are tunneled through the network. When an OAM frame flows between the Ethernet and TMPLS networks, the OAM frame format changes to reflect the technology on which it is transported. In addition, the interworking function module 245 updates and/or rewrites related fields from the source OAM PDU to the target OAM PDU so that the target network obtains information regarding the required OAM action. Thus, end-to-end OAM functionality can be provided for the hybrid data path. The interworking function module 245 does not need to keep the status of the OAM PDU it processed. The role of the interworking function module 245 is to extend the OAM functionality from one network technology (e.g., Ethernet) to another one (e.g., TMPLS). This ability enables the service provider to monitor, diagnose, and localize faults across different network protocols. Hence, there is a need to provide end-to-end OAM functionality for diagnosing and localizing faults along a hybrid path.

Assuming that an OAM frame is initiated from the Ethernet node 130 to the TMPLS node 140 for a continuity check, the end-to-end connectivity fault management (CFM) procedures function with the interworking function module 245 as follows: (1) the Ethernet node 130 launches a first Ethernet OAM frame 150 intended for delivery to the TMPLS node 140 onto the Ethernet network 105, (2) the Ethernet network 105 transports the first Ethernet OAM frame 150 to the bridge 115, (3) the interworking function module 245 located in the bridge 115 receives the first Ethernet OAM frame 150, (4) the interworking function module 245 translates the first Ethernet OAM frame 150 into the TMPLS network 110 compatible first TMPLS OAM frame 155, (5) the first TMPLS OAM frame 155 is launched from the bridge 115 into the TMPLS network 110, (6) the TMPLS network 110 transports the first TMPLS OAM frame 155 to the TMPLS node 140, (7) the TMPLS node 140 on the TMPLS network 110 receives the first TMPLS OAM frame 155, and (8) the TMPLS node 140 initiates the appropriate action in response to the instructions of the first TMPLS OAM frame 155.

Assuming that an OAM frame is initiated from the Ethernet node 130 to the TMPLS node 140 for a loopback test, the end-to-end connectivity fault management (CFM) procedures function with the interworking function module 245 as follows: (1) the Ethernet node 130 launches a first Ethernet OAM frame 150 intended for delivery to the TMPLS node 140 onto the Ethernet network 105, (2) the Ethernet network 105 transports the first Ethernet OAM frame 150 to the bridge 115, (3) the interworking function module 245 located in the bridge 115 receives the first Ethernet OAM frame 150, (4) the interworking function module 245 translates the first Ethernet OAM frame 150 into the TMPLS network 110 compatible first TMPLS OAM frame 155, (5) the first TMPLS OAM frame 155 is launched from the bridge 115 into the TMPLS network 110, (6) the TMPLS network 110 transports the first TMPLS OAM frame 155 to the TMPLS node 140, (7) the TMPLS node 140 on the TMPLS network 110 receives the first TMPLS OAM frame 155, (8) reception of the first TMPLS OAM frame 155 by the TMPLS node 140 generates creation of an appropriate response second TMPLS OAM frame 160 reply message for the Ethernet node 130, (9) the TMPLS node 140 launches the response second TMPLS OAM frame 160 intended for delivery to the Ethernet node 130 onto the TMPLS network 110, (10) the TMPLS network 110 transports the response second TMPLS OAM frame 160 to the bridge 115, (11) the interworking function module 245 located in the bridge 115 receives the response second TMPLS OAM frame 160, (12) the interworking function module 245 translates the response second TMPLS OAM frame 160 into the Ethernet network 105 compatible response second Ethernet OAM frame 165, (13) the response second Ethernet OAM frame 165 is launched from the bridge 115 into the Ethernet network 105, (14) the Ethernet network 105 transports the response second Ethernet OAM frame 165 to the Ethernet node 130, (15) the Ethernet node 130 on the Ethernet network 105 receives the response second Ethernet OAM frame 165, and (16) the Ethernet node 130 initiates appropriate action in response to the reception of the response second Ethernet OAM frame 165.

Assuming that an OAM frame is initiated from the TMPLS node 140 to the Ethernet node 130 for a continuity check, the end-to-end connectivity fault management (CFM) procedures function with the interworking function module 245 as follows: (1) the TMPLS node 140 launches a second TMPLS OAM frame 160 intended for delivery to the Ethernet node 130 onto the TMPLS network 110, (2) the TMPLS network 110 transports the second TMPLS OAM frame 160 to the bridge 115, (3) the interworking function module 245 located in the bridge 115 receives the second TMPLS OAM frame 160, (4) the interworking function module 245 translates the second TMPLS OAM frame 160 into the Ethernet network 105 compatible second Ethernet OAM frame 165, (5) the second Ethernet OAM frame 165 is launched from the bridge 115 into the Ethernet network 105, (6) the Ethernet network 105 transports the second Ethernet OAM frame 165 to the Ethernet node 130, (7) the Ethernet node 130 on the Ethernet network 105 receives the second Ethernet OAM frame 165, and (8) the Ethernet node 130 initiates the appropriate action in response to the instructions of the second Ethernet OAM frame 165.

Assuming that an OAM frame is initiated from the TMPLS node 140 to the Ethernet node 130 for a loopback test, the end-to-end connectivity fault management (CFM) procedures function with the interworking function module 245 as follows: (1) the TMPLS node 140 launches a second TMPLS OAM frame 160 intended for delivery to the Ethernet node 130 onto the TMPLS network 110, (2) the TMPLS network 110 transports the second TMPLS OAM frame 160 to the bridge 115, (3) the interworking function module 245 located in the bridge 115 receives the second TMPLS OAM frame 160, (4) the interworking function module 245 translates the second TMPLS OAM frame 160 into the Ethernet network 105 compatible second Ethernet OAM frame 165, (5) the second Ethernet OAM frame 165 is launched from the bridge 115 into the Ethernet network 105, (6) the Ethernet network 105 transports the second Ethernet OAM frame 165 to the Ethernet node 130, (7) the Ethernet node 130 on the Ethernet network 105 receives the second Ethernet OAM frame 165, (8) reception of the second Ethernet OAM frame 165 by the Ethernet node 130 generates creation of an appropriate response first Ethernet OAM frame 150 reply message to the TMPLS node 140, (9) the Ethernet node 130 launches the response first Ethernet OAM frame 150 intended for delivery to the TMPLS node 140 onto the Ethernet network 105, (10) the Ethernet network 105 transports the response first Ethernet OAM frame 150 to the bridge 115, (11) the interworking function module 245 located in the bridge 115 receives the response first Ethernet OAM frame 150, (12) the interworking function module 245 translates the response first Ethernet OAM frame 150 into a TMPLS network 110 compatible response first TMPLS OAM frame 155, (13) the response first TMPLS OAM frame 155 is launched from the bridge 115 into the TMPLS network 110, (14) the TMPLS network 110 transports the response first TMPLS Ethernet OAM frame 155 to the TMPLS node 140, (15) the TMPLS node 140 on the TMPLS network 110 receives the response first TMPLS OAM frame 155, and (16) the TMPLS node 140 initiates appropriate action in response to the reception of the response first TMPLS OAM frame 155.

The current preliminary specification for Transport Multi-Protocol Label Switch networks 110 supports the continuity and loopback test protocols for connectivity fault management. The principles disclosed herein for the interworking function module 245 can be applied to other types of OAM messages in addition to the continuity and loopback tests.

The interworking function module 245 maintains associated mapping information between Ethernet VLAN and TMPLS routing labels. This mapping information can be kept in a database, a table, or other memory structure in the memory 247 in the bridge 115.

Figure 3:
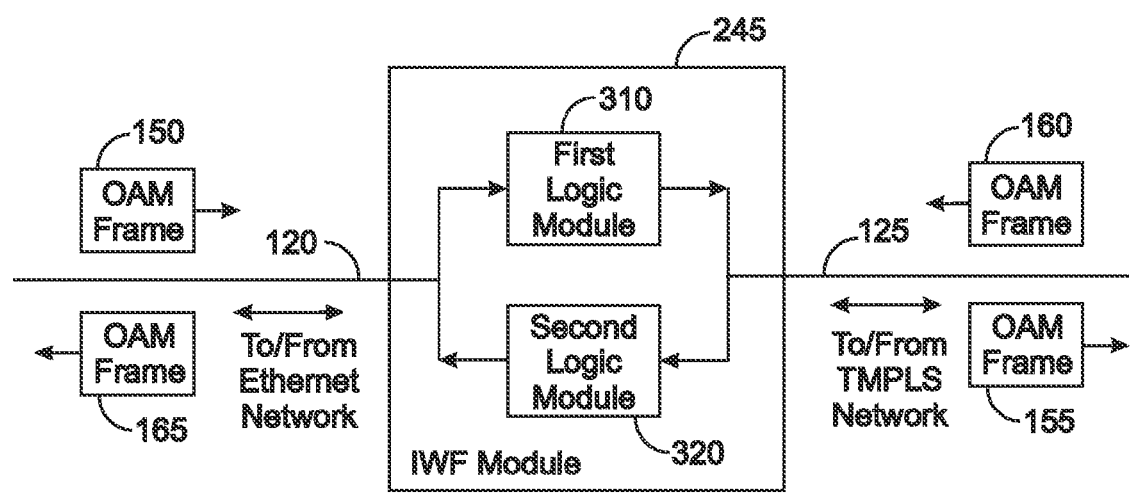
FIG. 3 is a block diagram of the interworking function module of FIG. 2.

FIG. 3 is a block diagram of the interworking function module 245 of FIG. 2. In the representative embodiment of FIG. 3, the interworking function module 245 comprises a first logic module 310 and a second logic module 320. Signals from the Ethernet node 130 and carried by the Ethernet network 105 are received by the interworking function module 245 on the first communication medium 120, and signals to the Ethernet node 130 and carried by the Ethernet network 105 are transmitted from the interworking function module 245 on the first communication medium 120. Signals from the TMPLS node 140 and carried by the TMPLS network 110 are received by the interworking function module 245 on the second communication medium 125, and signals to the TMPLS node 140 and carried by the TMPLS network 110 are transmitted from the interworking function module 245 on the second communication medium 125.

As needed, the Ethernet node 130 transmits a first Ethernet OAM frame 150 which, after transport through the Ethernet network 105, is received by the bridge 115. The received first Ethernet OAM frame 150 is mapped into the first TMPLS OAM frame 155 within the bridge 115 by the first logic module 310. The first TMPLS OAM frame 155 is launched onto the TMPLS network 110 from the bridge 115 and subsequently received by the TMPLS node 140 after transport through the TMPLS network 110.

As needed, the TMPLS node 140 transmits a second TMPLS OAM frame 160 which, after transport through the TMPLS network 110, is received by the bridge 115. The received second TMPLS OAM frame 160 is mapped into second Ethernet OAM frame 165 within the bridge 115 by the second logic module 320. The second Ethernet OAM frame 165 is launched onto the Ethernet network 105 from the bridge 115 and subsequently received by the Ethernet node 130 after transport through the Ethernet network 105.

Figure 4:
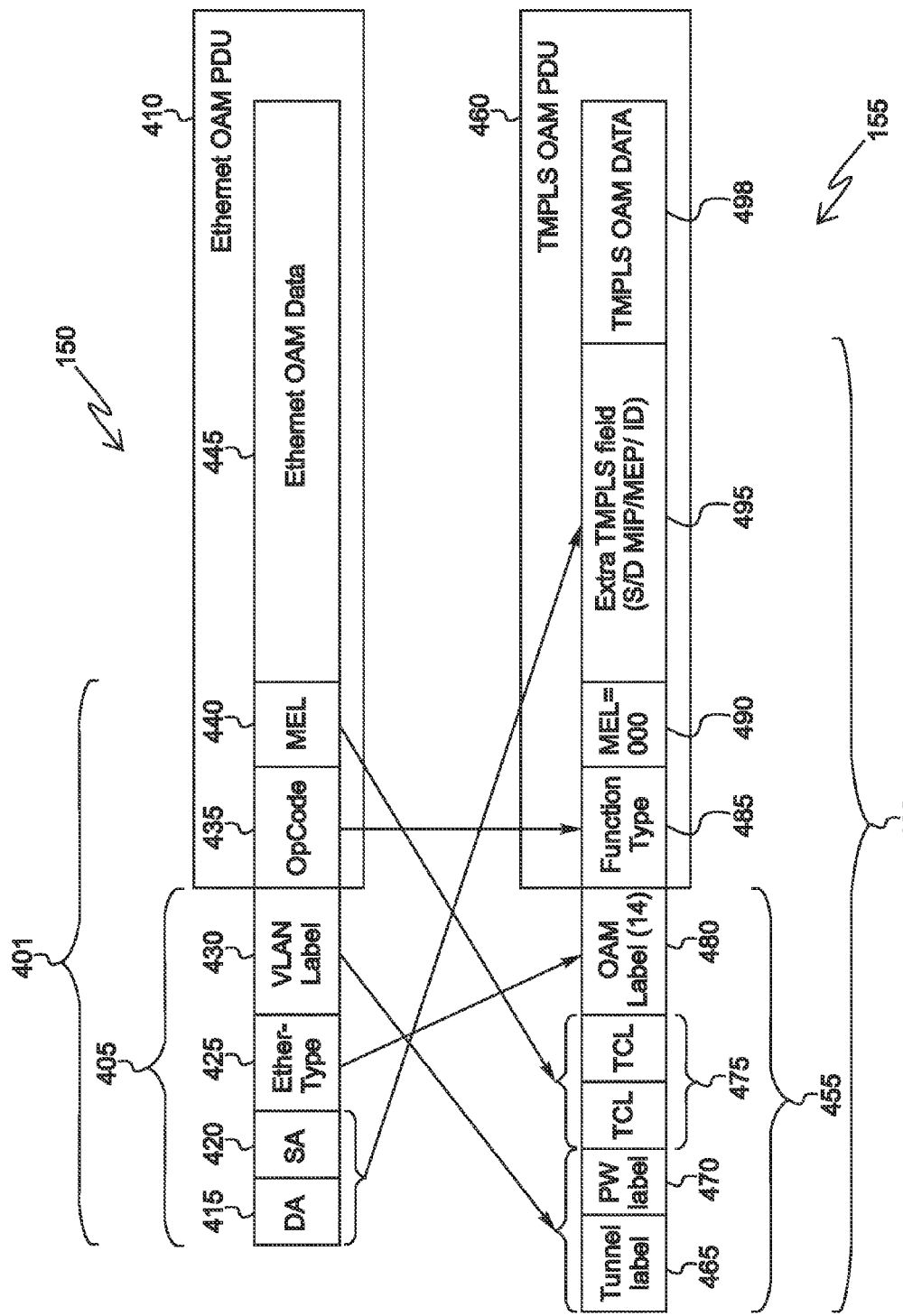
FIG. 4 is a block diagram of the first Ethernet Operation Administration and Maintenance frame and the first Transport Multi-Protocol Label Switching Operation Administration and Maintenance frame as converted by the first logic module of FIG. 3.

FIG. 4 is a block diagram of the first Ethernet Operation Administration and Maintenance frame 150 and the first Transport Multi-Protocol Label Switching Operation Administration and Maintenance frame 155 as converted by the first logic module 310 of FIG. 3. As the TMPLS OAM system is currently under development, FIG. 4 illustrates the concept of mapping corresponding fields from the Ethernet protocol to the Transport Multi-Protocol Label Switch protocol. Specific locations of particular fields may ultimately differ dependent upon the final specification for the TMPLS OAM system. In the representative embodiment of FIG. 4, the first Ethernet OAM frame 150 comprises a Media Access Control header 405 and an Ethernet Operation Administration and Maintenance Protocol Data Unit 410. The Media Access Control header 405 may be referred to herein as the MAC header 405, and the Ethernet Operation Administration and Maintenance Protocol Data Unit 410 may be referred to herein as the Ethernet OAM PDU 410.

The MAC header 405 comprises a destination address field (DA field) 415, a source address field (SA field) 420, an EtherType label field 425, and a VLAN label field 430. The Ethernet OAM PDU 410 comprises an operation code field (OpCode field) 435, an Ethernet maintenance entity level field 440, and an Ethernet Operation Administration and Maintenance data field 445. The Ethernet maintenance entity level field 440 may also be referred to herein as the Ethernet MEL field 440, and the Ethernet Operation Administration and Maintenance data field 445 may also be referred to as the Ethernet OAM data field 445.

The value in the destination address field 415 identifies which station(s) should receive the data in the first Ethernet OAM frame 150. The value in the destination address field 415 may identify a single station, a defined group of stations, or all stations on the network. The value in the source address field 420 identifies the station sending the first Ethernet OAM frame 150. The value in the EtherType label field 425 indicates which protocol is being transported in the first Ethernet OAM frame 150. And, the value in the VLAN label field 430 identifies the virtual or logical local area network (LAN) to which the source station identified by the value in the source address field 420 belongs. The value in the operation code field 435 further identifies the action(s) to be performed upon reception of the first Ethernet OAM frame 150. The value in the Ethernet MEL field 440 specifies the level of the first Ethernet OAM frame 150. The Ethernet OAM data field 445 comprises data associated with the particular operation administration and maintenance activity to be performed.

Also In the representative embodiment of FIG. 4, the first TMPLS OAM frame 155 comprises a Transport Multi-Protocol Label Switch Operation Administration and Maintenance header 455 and a Transport Multi-Protocol Label Switch Operation Administration and Maintenance Protocol Data Unit 460. The Transport Multi-Protocol Label Switch Operation Administration and Maintenance header 455 may also be referred to herein as the TMPLS OAM header 455. The Transport Multi-Protocol Label Switch Operation Administration and Maintenance Protocol Data Unit 460 may be also referred to herein as the TMPLS OAM PDU 460.

The TMPLS OAM header 455 comprises a tunnel label field 465, a pseudo wire label field 470, a tandem connection field 475, and a label 14 field 480. The pseudo wire label field 470 may also be referred to herein as the PW label field 470, and the tandem connection label field 475 may also be referred to herein as the TC label field 475 and as the TCL field 475. The TMPLS OAM PDU 460 comprises a function type field 485, a Transport Multi-Protocol Label Switch Operation Administration and Maintenance maintenance entity level label field 490, an extra Transport Multi-Protocol Label Switch Operation Administration and Maintenance field 495, and a Transport Multi-Protocol Label Switch Operation Administration and Maintenance Data field 498. The Transport Multi-Protocol Label Switch Operation Administration and Maintenance maintenance entity level label field 490 may also be referred to herein as the TMPLS OAM MEL label field 490. The extra Transport Multi-Protocol Label Switch Operation Administration and Maintenance field 495 may also be referred to herein as the extra TMPLS OAM field 495. The Transport Multi-Protocol Label Switch Operation Administration and Maintenance data field 498 may also be referred to herein as the TMPLS OAM data field 498.

The value in the function type field 485 further identifies the type of the first TMPLS OAM frame 155. The value in the TMPLS MEL label field 490 is found in the default information 249 in the memory 247 where it has the value of "000". The value in the extra TMPLS OAM field 495 comprises the source address of the frame and the destination address which could be the address of the maintenance association end point (MEP) or the maintenance association intermediate point (MIP) address for the frame. The TMPLS OAM data field 498 comprises the data associated with the particular operation administration and maintenance activity to be performed.

The first logic module 310 maps the first Ethernet OAM frame 150 into the first TMPLS OAM frame 155 by (1) mapping the values in the destination address field 415 and the source address field 420 into values in the extra TMPLS OAM field 495, (2) mapping the value in the EtherType label field 425 into a value in the label 14 field 480, (3) mapping the value in the VLAN label field 430 into values in the tunnel label field 465 and the pseudo wire label field 470, (4) mapping the value in the operation code field 435 into a value in the function type field 485, (5) mapping the value in the Ethernet MEL field 440 into a value in the tandem connection label field 475, and (5) setting the value in the TMPLS OAM MEL label field 490 equal to the default value of "000".

First control parameter fields 401 comprise the destination address field 415, the source address field 420, the EtherType label field 425, the VLAN label field 430, the operation code field 435, and the Ethernet MEL field 440. Second control parameter fields 402 comprise the tunnel label field 465, the pseudo wire label field 470, the TCL field 475, the label 14 field 480, the function type field 485, the TMPLS OAM MEL label field 490, and extra TMPLS OAM field 495.

Figure 5:
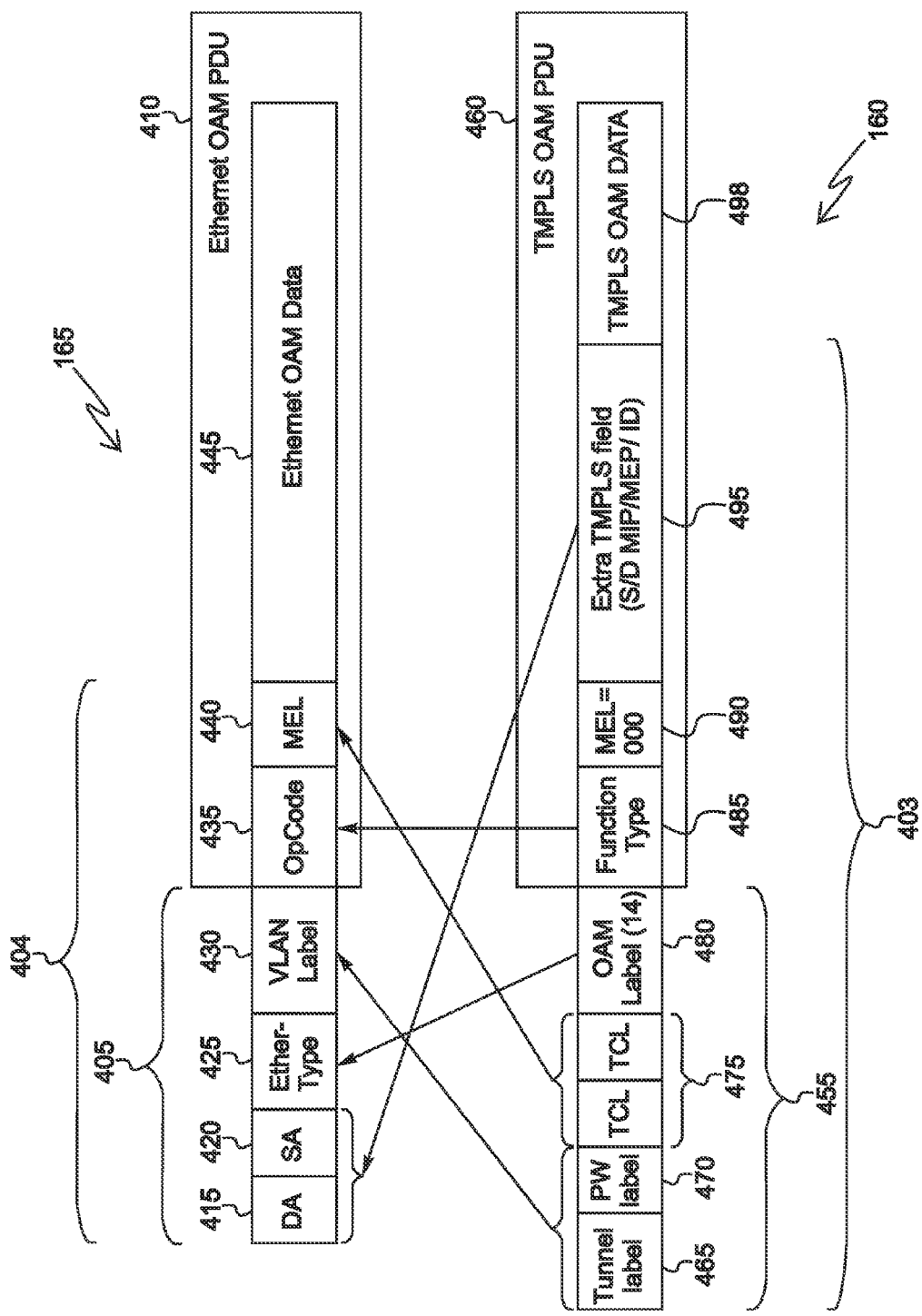
FIG. 5 is a block diagram of the second Transport Multi-Protocol Label Switch Operation Administration and Maintenance frame and the second Ethernet Operation Administration and Maintenance frame as converted by the second logic module of FIG. 3.

FIG. 5 is a block diagram of the second Transport Multi-Protocol Label Switch Operation Administration and Maintenance frame 160 and the second Ethernet Operation Administration and Maintenance frame 165 as converted by the second logic module 320 of FIG. 3. As the TMPLS OAM system is currently under development, FIG. 5 illustrates the concept of mapping corresponding fields from the Transport Multi-Protocol Label Switch protocol to the Ethernet protocol. Specific location of particular fields may ultimately differ dependent upon the final specification for the TMPLS OAM system. In the representative embodiment of FIG. 5, the second TMPLS OAM frame 160 comprises the TMPLS OAM header 455 and the TMPLS OAM PDU 460.

The TMPLS OAM header 455 comprises the tunnel label field 465, the pseudo wire label field 470, the tandem connection label field 475, and the Label 14 field 480. The TMPLS OAM PDU 460 comprises the function type field 485, the TMPLS OAM MEL label field 490, the extra TMPLS OAM field 495, and the TMPLS OAM data field 498.

The value stored in the function type field 485 further identifies the type of the second TMPLS OAM frame 160. The value stored in the TMPLS OAM MEL label field 490 is set to the default value "000". The extra TMPLS OAM field 495 comprises the source address of the frame and the destination address for the frame which could be a maintenance association end point (MEP) or a maintenance association intermediate point (MIP) address. The contents of the TMPLS OAM data field 498 comprises the data associated with the particular operation administration and maintenance activity to be performed.

Also, in the representative embodiment of FIG. 5, the second Ethernet OAM frame 165 comprises the Media Access Control header 405 and the Ethernet Operation Administration and Maintenance Protocol Data Unit 410. The MAC header 405 comprises the destination address field (DA field) 415, the source address field (SA field) 420, the EtherType label field 425, and the VLAN label field 430. The Ethernet OAM PDU 410 comprises the operation code field (OpCode field) 435, the Ethernet maintenance entity level field 440, and the Ethernet Operation Administration and Maintenance data field 445.

The value in the destination address field 415 identifies which station(s) should receive data in the second Ethernet OAM frame 165. The value in the destination address field 415 may identify a single station, a defined group of stations, or all stations on the network. The value in the source address field 420 identifies the station sending the second TMPLS OAM frame 160. The value in the EtherType label field 425 indicates which protocol is being transported in the second Ethernet OAM frame 165. And, the value in the VLAN label field 430 identifies the virtual or logical local area network (LAN) to which the source station identified by the value in the source address field 420 belongs. And, the value in the operation code field 435 further identifies the type of the second Ethernet OAM frame 165. The value in the Ethernet MEL field 440 specifies the level of the second Ethernet OAM frame 165. The Ethernet OAM data field 445 comprises the data associated with the particular operation administration and maintenance activity to be performed.

The second logic module 320 maps the second TMPLS OAM frame 160 into the second Ethernet OAM frame 165 by (1) mapping the value in the tunnel label field 465 and the pseudo wire label field 470 into the value in the VLAN label field 430, (2) mapping the value in the tandem connection label field 475 into the value in the Ethernet MEL field 440, (3) mapping the value in the label 14 field 480 into a value in the EtherType label field 425, (4) mapping the value in the function type field 485 into a value in the operation code field 435, and (5) mapping the values in the extra TMPLS OAM field 495 into values in the destination address field 415 and the source address field 420.

Third control parameter fields 403 comprise the tunnel label field 465, the pseudo wire label field 470, the TCL field 475, the label 14 field 480, the function type field 485, the TMPLS OAM MEL label field 490, and extra TMPLS OAM field 495. Fourth control parameter fields 404 comprise the destination address field 415, the source address field 420, the EtherType label field 425, the VLAN label field 430, the operation code field 435, and the Ethernet MEL field 440.

Figure 6:
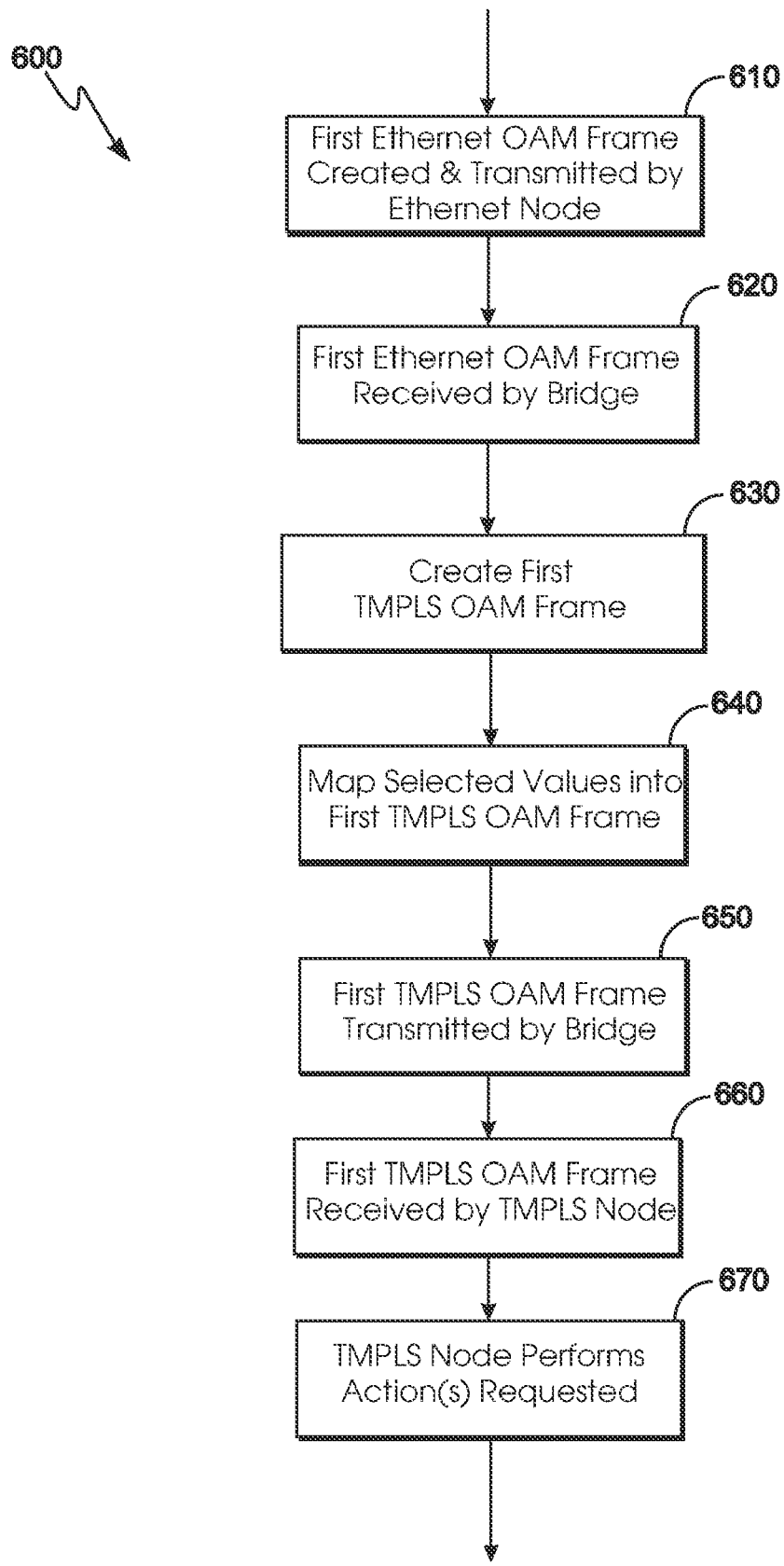
FIG. 6 is a flow chart of a method for transporting Operation Administration and Maintenance frames from the Ethernet node to the Transport Multi-Protocol Label Switch node in the Ethernet/Transport Multi-Protocol Label Switch hybrid network of FIGS. 1 and 2.

FIG. 6 is a flow chart of a method 600 for transporting Operation Administration and Maintenance frames 150,155 from the Ethernet node 130 to the Transport Multi-Protocol Label Switch node 140 in the Ethernet/Transport Multi-Protocol Label Switch hybrid network 100 of FIGS. 1 and 2. In block 610 of FIG. 6, the Ethernet node 130 creates the first Ethernet OAM frame 150 and transmits the created first Ethernet OAM frame 150 into the Ethernet network 105. For transport through the Ethernet network 105, the first Ethernet OAM frame 150 is embodied in the first carrier wave 170. Block 610 then transfers control to block 620.

In block 620, the first Ethernet OAM frame 150 is received by the bridge 115 from the Ethernet network 105. Block 620 then transfers control to block 630.

In block 630, the first logic module 310 in the bridge 115 creates the first TMPLS OAM frame 155. Block 630 then transfers control to block 640.

In block 640, the first logic module 310 maps values in selected first control parameter fields 401 from the first Ethernet OAM frame 150 into values in selected second control parameter fields 402 in the first TMPLS OAM frame 155 and adds extra TMPLS OAM field 495 as necessary to the first TMPLS OAM frame 155. The values mapped into the first TMPLS OAM frame 155 further comprise preselected default information 249 and routing information 248 stored in the memory 247. Block 640 then transfers control to block 650.

In block 650, the bridge 115 transmits the first TMPLS OAM frame 155 into the TMPLS network 110. For transport through the TMPLS network 110, the first TMPLS OAM frame 155 is embodied in the second carrier wave 175. Block 650 then transfers control to block 660.

In block 660, the first TMPLS OAM frame 155 embodied in the second carrier wave 175 is received from the TMPLS network 110 by the TMPLS node 140. Block 660 then transfers control to block 670.

In block 670, depending upon the contents of the first TMPLS OAM frame 155 received by the TMPLS node 140, the TMPLS node 140 responds with appropriate action(s). Block 670 then terminates the process.

Figure 7:
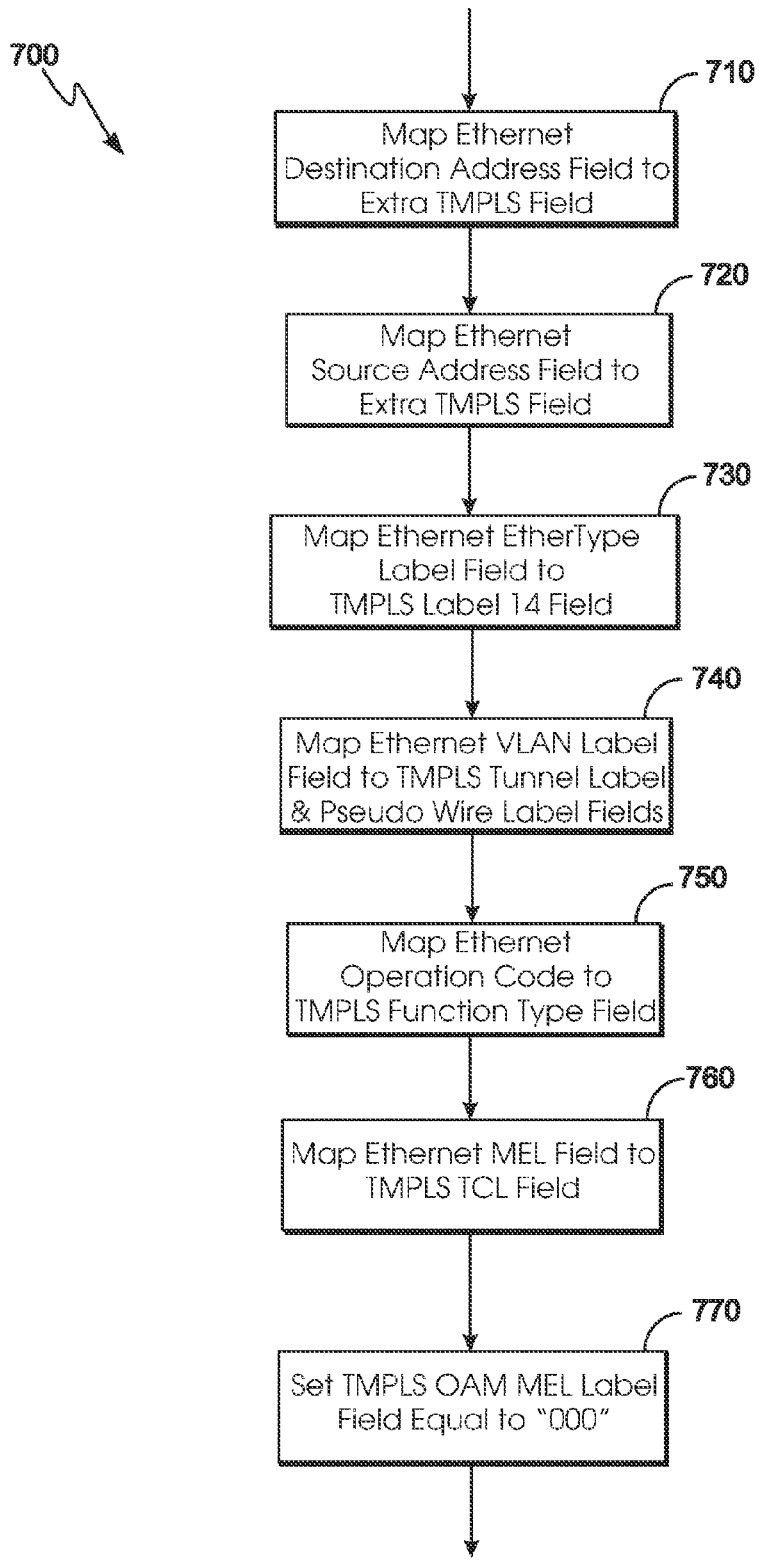
FIG. 7 is a more detailed flow chart of a method for the mapping step of FIG. 6.

FIG. 7 is a more detailed flow chart of a method 700 for the mapping step 640 of FIG. 6. In block 710 of the method 700 shown in FIG. 7, the value in the destination address field 415 is mapped into a value in a part of the extra TMPLS OAM field 495. Block 710 then transfers control to block 720.

In block 720, the value in the source address field 420 is mapped into a value in another part of the extra TMPLS OAM field 495. Block 720 then transfers control to block 730.

In block 730, the value in the EtherType label field 425 is mapped into a value in the label 14 field 480. Block 730 then transfers control to block 740.

In block 740, the value in the VLAN label field 430 is mapped into values in the tunnel label field 465 and the pseudo wire label field 470. Block 740 then transfers control to block 750.

In block 750, the value in the operation code field 435 is mapped into a value in the function type field 485. Block 750 then transfers control to block 760.

In block 760, the value in the Ethernet MEL field 440 is mapped into a value in the TCL field 475. Block 760 then transfers control to block 770.

In block 770, the value in the TMPLS OAM MEL label field 490 is set equal to the default value "000". Block 770 then terminates the process.

Figure 8:
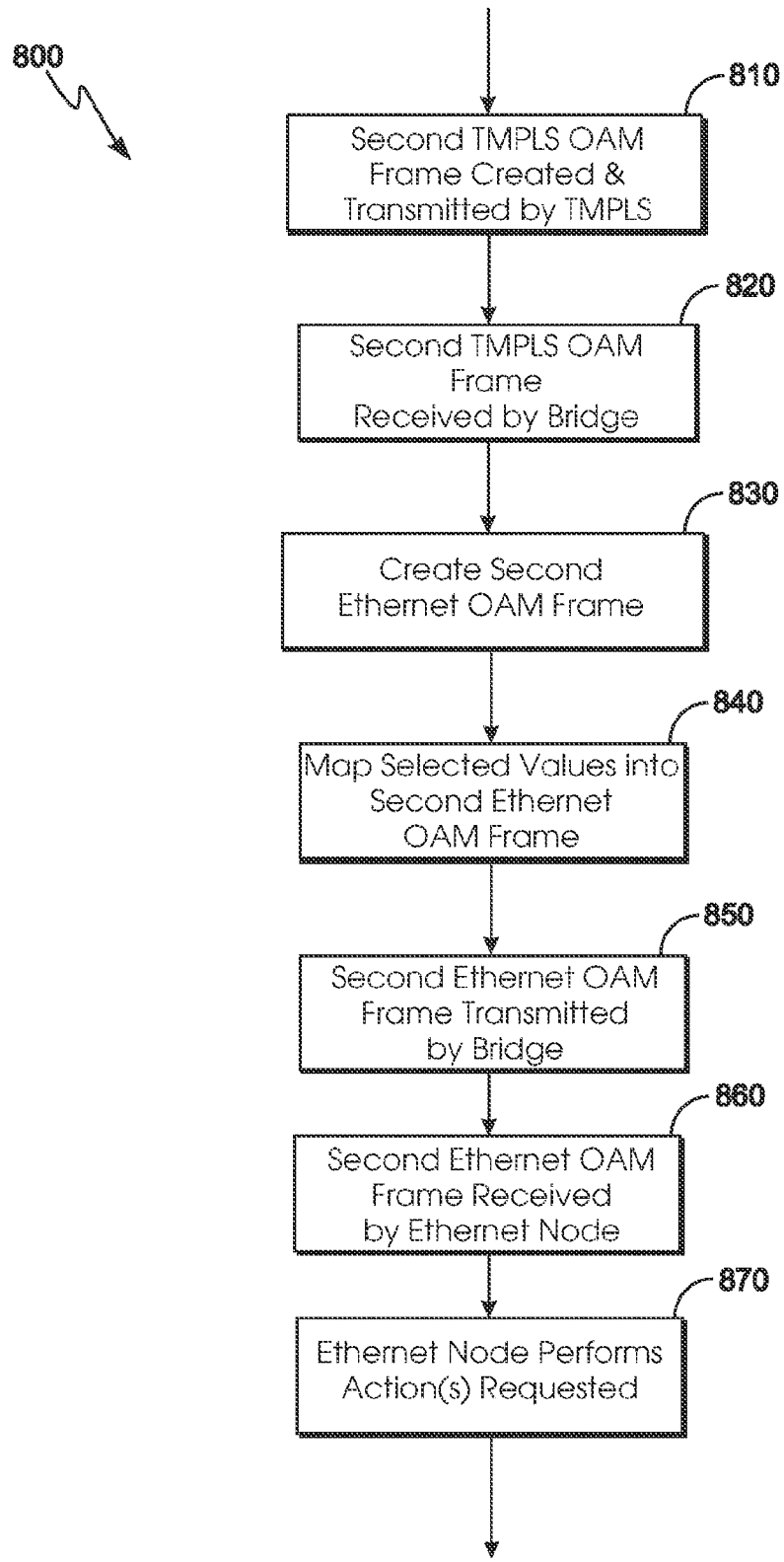
FIG. 8 is a flow chart of a method for transporting Operation Administration and Maintenance frames from the Transport Multi-Protocol Label Switch node to the Ethernet node in the Ethernet/Transport Multi-Protocol Label Switch hybrid network of FIGS. 1 and 2.

FIG. 8 is a flow chart of a method 800 for transporting Operation Administration and Maintenance frames 160,165 from the Transport Multi-Protocol Label Switch node 140 to the Ethernet node 130 in the Ethernet/Transport Multi-Protocol Label Switch hybrid network 100 of FIGS. 1 and 2. In block 810 of FIG. 8, the TMPLS node 140 creates the second TMPLS OAM frame 160 and transmits the created second TMPLS OAM frame 160 into the TMPLS network 110. For transport through the TMPLS network 110, the second TMPLS OAM frame 160 is embodied in the third carrier wave 180. Block 810 then transfers control to block 820.

In block 820, the second TMPLS OAM frame 160 is received from the TMPLS network 110 by the bridge 115. Block 820 then transfers control to block 830.

In block 830, the second logic module 320 in the bridge 115 creates the second Ethernet OAM frame 165. Block 830 then transfers control to block 840.

In block 840, the second logic module 320 maps values in selected third control parameter fields 403 from the second TMPLS OAM frame 160 into values in selected fourth control parameter fields 404 in the second Ethernet OAM frame 165. The values mapped into the second Ethernet OAM frame 165 further comprise routing information 248 stored in the memory 247. Block 840 then transfers control to block 850.

In block 850, the bridge 115 transmits the second Ethernet OAM frame 165 into the Ethernet network 105. For transport through the Ethernet network 105, the second Ethernet OAM frame 165 is embodied in the fourth carrier wave 185. Block 850 then transfers control to block 860.

In block 860, the second Ethernet OAM frame 165 embodied in the fourth carrier wave 185 is received from the Ethernet network 105 by the Ethernet node 130. Block 860 then transfers control to block 870.

In block 870, depending upon the contents of the second Ethernet OAM frame 165 received by the Ethernet node 130, the Ethernet node 130 responds with appropriate action(s). Block 870 then terminates the process.

Figure 9:
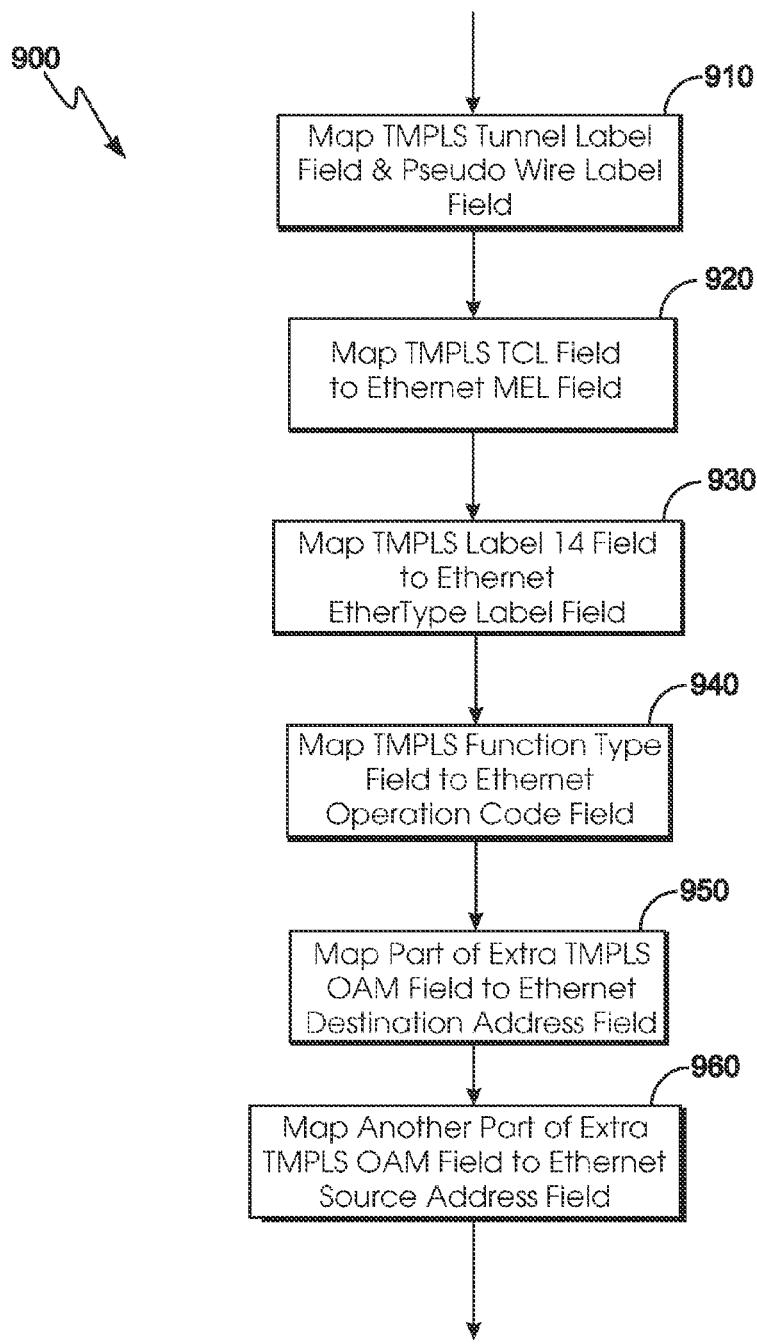
FIG. 9 is a more detailed flow chart of a method for the mapping step of FIG. 8.

FIG. 9 is a more detailed flow chart of a method 900 for the mapping step 840 of FIG. 8. In block 910 of the method 900 shown in FIG. 9, the tunnel label field 465 and the pseudo wire label field 470 are mapped into the VLAN label field 430. Block 910 then transfers control to block 920.

In block 920, the TCL field 475 is mapped into the Ethernet MEL field 440. Block 920 then transfers control to block 930.

In block 930, the label 14 field 480 is mapped into the EtherType label field 425. Block 930 then transfers control to block 940.

In block 940, the function type field 485 is mapped into the operation code field 435. Block 940 then transfers control to block 950.

In block 950, a part of the extra TMPLS OAM field 495 is mapped into the destination address field 415. Block 950 then transfers control to block 960.

In block 960, another part of the extra TMPLS OAM field 495 is mapped into the source address field 420. Block 960 then terminates the process.

As is the case, in many data-processing products, the various systems and components described above may be implemented as a construct selected from the group consisting of hardware, firmware, software, a hardware/firmware combination, a hardware/software combination, a firmware/software combination, and a hardware/firmware/software combination. Moreover, the functionality required for use of the representative embodiments may be embodied in computer-readable media (such as floppy disks, conventional hard disks, DVDs, CD-ROMs, Flash ROMs, nonvolatile ROM, RAM, and the like) to be used in programming an information-processing apparatus (e.g., the bridge 115 comprising the elements shown in the representative embodiments of the figures) to perform in accordance with the techniques so described.

The terms "program storage medium" and "computer readable memory device" are broadly defined herein to include any kind of computer memory such as, but not limited to the above mentioned, floppy disks, conventional hard disks, DVDs, CD-ROMs, Flash ROMs, nonvolatile ROM, RAM, and the like.

The Ethernet network 105 and the Transport Multi-Protocol Label Switching network 110 may be designed and fabricated such that the first, second, third, and fourth carrier waves 170,175,180,185 propagate by any type of electromagnetic waves consistent with the specification for the respective network, such as but not limited to high frequency transmissions, optical wavelength transmissions, and the like.

In representative embodiments, modules and methods are disclosed herein that enable end-to-end Operation Administration and Maintenance capability for Ethernet/TMPLS hybrid networks 100. The techniques described do not necessitate maintaining state machine(s) with their associated resource requirements. It is not necessary to maintain information regarding the frames received by the bridge 115. The interworking function module 245 in the bridge 115 connecting the Ethernet Network 105 to the TMPLS network 110 maps fields from Ethernet OAM frames 150 received from the Ethernet network 105 into fields in TMPLS OAM frames 155 transmitted to the TMPLS network 110. The interworking function module also 245 maps fields from TMPLS OAM frames 160 received from the TMPLS network 110 into fields in Ethernet OAM frames 165 transmitted to the Ethernet network 105. These techniques facilitate the end-to-end connectivity and fault management for service providers who may operate both Ethernet and TMPLS networks. The interworking function module 245 can support not only provider OAM frames but also customer data and OAM frame interchange between connected Ethernet and TMPLS networks 105, 110. The interworking function module 245 can be independent of the platform employed, being dependent only upon the Ethernet and TMPLS protocols.

The representative embodiments, which have been described in detail herein, have been presented by way of example and not by way of limitation. It will be understood by those skilled in the art that various changes may be made in the form and details of the described embodiments resulting in equivalent embodiments that remain within the scope of the appended claims.

What is claimed is:

1. A method for transmitting an Operation Administration and Maintenance frame in an Ethernet/Transport Multi-Protocol Label Switch hybrid network, comprising:

receiving a first Ethernet Operation Administration and Maintenance frame (Ethernet OAM frame) by a node;

mapping values in an Ethernet Operation Administration and Maintenance data field in a protocol data unit (PDU) in the first Ethernet OAM frame into a Transport Multi-Protocol Label Switch Operation Administration and Maintenance data field (TMPLS OAM data field) in a PDU in a first Transport Multi-Protocol Label Switch Operation Administration and Maintenance frame (TMPLS OAM frame) by the node;

mapping values in first control parameter fields in the first Ethernet OAM frame into second control parameter fields in the first TMPLS OAM frame by the node, wherein the PDU in the first TMPLS OAM frame comprises an added extra Transport Multi-Protocol Label Switch Operation Administration and Maintenance field (extra TMPLS OAM field) and wherein the second control parameter fields further comprise preselected default information and routing information mapped from values stored in a memory;

wherein first control parameter fields in the first Ethernet OAM frame comprise a destination address field and a source address field; and wherein value in the destination address field is mapped into a part of the extra TMPLS OAM field and value in the source address field is mapped into another part of the extra TMPLS OAM field; and transmitting the first TMPLS OAM frame by the node.

2. The method as recited in claim 1, wherein first control parameter fields in the first Ethernet OAM frame further comprise a an EtherType label field, a VLAN label field, an operation code field, and an Ethernet maintenance entity level field, wherein second control parameter fields in the first TMPLS OAM frame comprise a tunnel label field, a pseudo wire label field, a tandem connection label field, a label 14 field, a function type field, a Transport Multi-Protocol Label Switch Operation Administration and Maintenance maintenance entity level label field (TMPLS OAM MEL label field), wherein value in the EtherType label field is mapped into the label 14 field, wherein value in the VLAN label field is mapped into the tunnel label field and the pseudo wire label field, wherein value in the operation code field is mapped into the function type field, wherein value in the Ethernet maintenance entity level field is mapped into the tandem connection label field, and wherein value in the TMPLS OAM MEL label field is set equal to "000".

3. The method as recited in claim 1, wherein the mapping steps are performed in a bridge and wherein the bridge interconnects an Ethernet network and a Transport Multi-Protocol Label Switching network (TMPLS network).

4. The method as recited in claim 3, wherein the first Ethernet OAM frame is transmitted from an Ethernet node to the bridge via the Ethernet network and wherein the fist TMPLS OAM frame is transmitted to a Transport Multi-Protocol Label Switching node from the bridge via the TMPLS network.

5. The method as recited in claim 1, further comprising:

mapping values in the TMPLS OAM data field in the PDU in a second TMPLS OAM into the Ethernet Operation Administration and Maintenance data field in the PDU in a second Ethernet OAM frame; and mapping values in third control parameter fields in the second TMPLS OAM frame into fourth control parameter fields in the second Ethernet OAM frame, wherein the PDU in the second Ethernet OAM frame comprises added extra fields as necessary and wherein the fourth control parameter fields in the second Ethernet OAM frame further comprise routing information mapped from values stored in the memory.

6. The method as recited in claim 5, wherein third control parameter fields in the second TMPLS OAM frame comprise a tunnel label field, a pseudo wire label field, a tandem connection label field, a label 14 field, a function type field, a Transport Multi-Protocol Label Switch Operation Administration and Maintenance maintenance entity level label field, and extra Transport Multi-Protocol Label Switch Operation Administration and Maintenance field (extra TMPLS OAM field), wherein fourth control parameter fields in the second Ethernet OAM frame comprise a destination address field, a source address field, an EtherType label field, a VLAN label field, an operation code field, and an Ethernet maintenance entity level field, wherein values in the tunnel label field and the pseudo wire label field in the second TMPLS OAM frame are mapped into the VLAN label field in the second OAM frame, wherein value in the tandem connection label field in the second TMPLS OAM frame is mapped into the Ethernet maintenance entity level field in the second Ethernet OAM frame, wherein value in the label 14 field in the second TMPLS OAM frame is mapped into the EtherType label field in the second Ethernet OAM frame, wherein value in the function type field in the second TMPLS OAM frame is mapped into the operation code field in the second Ethernet OAM frame, wherein value in a part of the extra TMPLS OAM field in the second TMPLS OAM frame is mapped into the destination address field in the second Ethernet OAM frame, and wherein value in another part of the extra TMPLS OAM field in the second TMPLS OAM frame is mapped into the source address field in the second Ethernet OAM frame.

7. The method as recited in claim 5, wherein the mapping steps are performed in a bridge and wherein the bridge interconnects an Ethernet network and a Transport Multi-Protocol Label Switching network (TMPLS network).

8. The method as recited in claim 7, wherein the second TMPLS OAM frame is transmitted from a Transport Multi-Protocol Label Switching node to the bridge via the TMPLS network and wherein the second Ethernet OAM frame is transmitted to an Ethernet node from the bridge via the Ethernet network.

9. A network node, wherein the network node comprises:

a first network interface configured to be connected to an Ethernet network that receives an Ethernet Operation Administration and Maintenance frame (Ethernet OAM frame);

an interworking function module connected to the first network interface that generates a Transport Multi-Protocol Label Switch Operation Administration and Maintenance frame (TMPLS OAM frame) including:

a Transport Multi-Protocol Label Switch Operation Administration and Maintenance data field (TMPLS OAM data field) in a protocol data unit (PDU) that comprises mapped values from an Ethernet Operation Administration and Maintenance data field in a PDU in the Ethernet OAM frame, wherein the TMPLS OAM frame further includes second control parameter fields that comprise mapped values from first control parameter fields in the Ethernet OAM frame, wherein the first control parameter fields comprise a destination address field and a source address field, wherein the PDU in the TMPLS OAM frame comprises an extra Transport Multi-Protocol Label Switch Operation Administration and Maintenance field (extra TMPLS OAM field), wherein a part of the extra TMPLS OAM field comprises mapped value from the destination address field, wherein another part of the extra TMPLS OAM field comprises mapped value from the source address field, and wherein the second control parameter fields further comprise preselected default information and routing information mapped from values stored in a memory; and a second network interface connected to the interworking function module and configured to be connected to a Transport Multi-Protocol Label Switch (TMPLS) network that transmits the TMPLS OAM frame over the TMPLS network.

10. The network node in claim 9, wherein the first control parameter fields further comprise an EtherType label field, a VLAN label field, an operation code field, and an Ethernet maintenance entity level field, wherein second control parameter fields further comprise a tunnel label field, a pseudo wire label field, a tandem connection label field, a label 14 field, a function type field, a Transport Multi-Protocol Label Switch Operation Administration and Maintenance maintenance entity level label field (TMPLS OAM MEL label field), wherein the label 14 field comprises mapped value from the EtherType label field, wherein the tunnel label field and the pseudo wire label field comprise mapped values from the VLAN label field, wherein the function type field comprises mapped value from the operation code field, wherein the tandem connection label field comprises mapped value from the Ethernet maintenance entity level field, and wherein the TMPLS OAM MEL label field is set equal to "000".

11. The network node in claim 9, wherein mapped values in the TMPLS OAM data field and the second control parameter fields comprise values generated on the network node interconnecting the Ethernet network and the TMPLS network.

12. The network node in claim 11, wherein values generated are acquired from the Ethernet OAM frame transmitted from an Ethernet node to the network node via the Ethernet network.

13. The network node in claim 11, wherein the TMPLS OAM frame is transmitted from the network node to a Transport Multi-Protocol Label Switching node via the TMPLS network.

14. A network node, comprising wherein the node is operable to:

a first network interface that receives a Transport Multi-Protocol Label Switch Operation Administration and Maintenance frame (TMPLS OAM frame) over a first network;

an interworking function module connected to the first network interface that generates an Ethernet Operation Administration and Maintenance frame (Ethernet OAM frame), that includes an Ethernet Operation Administration and Maintenance data field in a protocol data unit (PDU), wherein the Ethernet Operation Administration and Maintenance data field comprises values mapped from a Transport Multi-Protocol Label Switch Operation Administration and Maintenance data field in a PDU in the TMPLS OAM frame, wherein fourth control parameter fields in the Ethernet OAM frame comprise value mapped from third control parameter fields in the TMPLS OAM frame, wherein the PDU in the Ethernet OAM frame comprises added extra fields as necessary, wherein the fourth control parameter fields further comprise routing information mapped from values stored in a memory, wherein third control parameter fields in the TMPLS OAM frame comprise an extra Transport Multi-Protocol Label Switch Operation Administration and Maintenance field (extra TMPLS OAM field), wherein fourth control parameter fields in the Ethernet OAM frame comprise a destination address field, a source address field, wherein the destination address field comprises a value mapped from a part of the extra TMPLS OAM field, and wherein the source address field comprises a value mapped from another part of the extra TMPLS OAM field; and a second network interface connected to the interworking function module that transmits the Ethernet OAM frame over a second network.

15. The network node in claim 14, wherein third control parameter fields in the TMPLS OAM frame further comprise a tunnel label field, a pseudo wire label field, a tandem connection label field, a label 14 field, a function type field, a Transport Multi-Protocol Label Switch Operation Administration and Maintenance maintenance entity level label field, wherein fourth control parameter fields in the Ethernet OAM frame further comprise an EtherType label field, a VLAN label field, an operation code field, and an Ethernet maintenance entity level field, wherein the VLAN label field comprises values mapped from the tunnel label field and the pseudo wire label field, wherein the Ethernet maintenance entity level field comprises value mapped from the tandem connection label field, wherein the EtherType label field comprises value mapped from the label 14 field, and wherein the operation code field comprises value mapped from the function type field.

16. The network node in claim 14, wherein mapped values in the Ethernet Operation Administration and Maintenance data field and the fourth control parameter fields comprise values generated on a bridge interconnecting an Ethernet network and a Transport Multi-Protocol Label Switching network (TMPLS network).

17. The network node in claim 16, wherein values generated are acquired from the TMPLS OAM frame transmitted from a Transport Multi-Protocol Label Switching node to the bridge via the TMPLS network.

18. The network node in claim 16, wherein the Ethernet OAM frame is transmitted from the bridge to an Ethernet node via the Ethernet network.

* * * * *